United States Patent Office 3,366,151
Patented Jan. 30, 1968

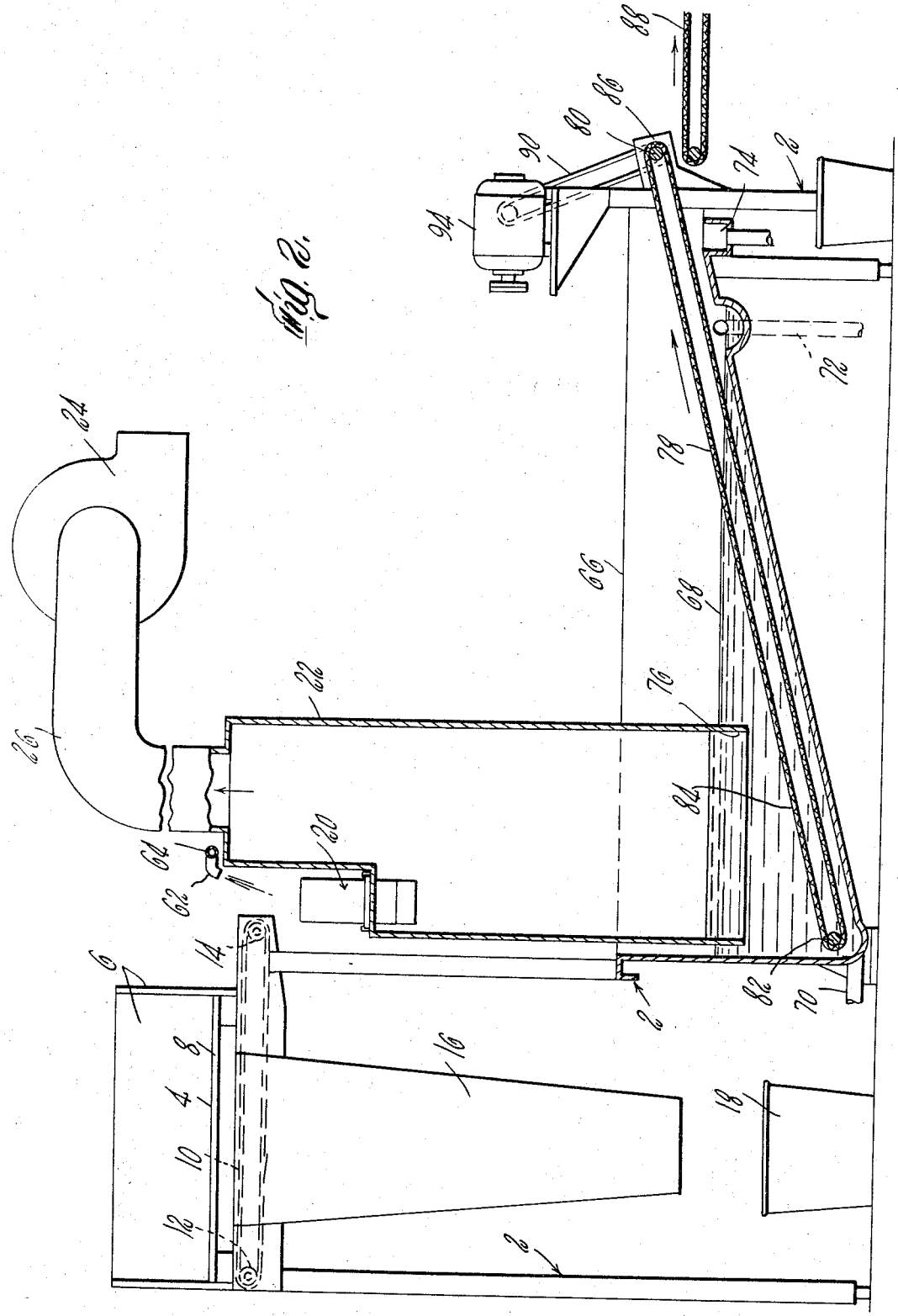

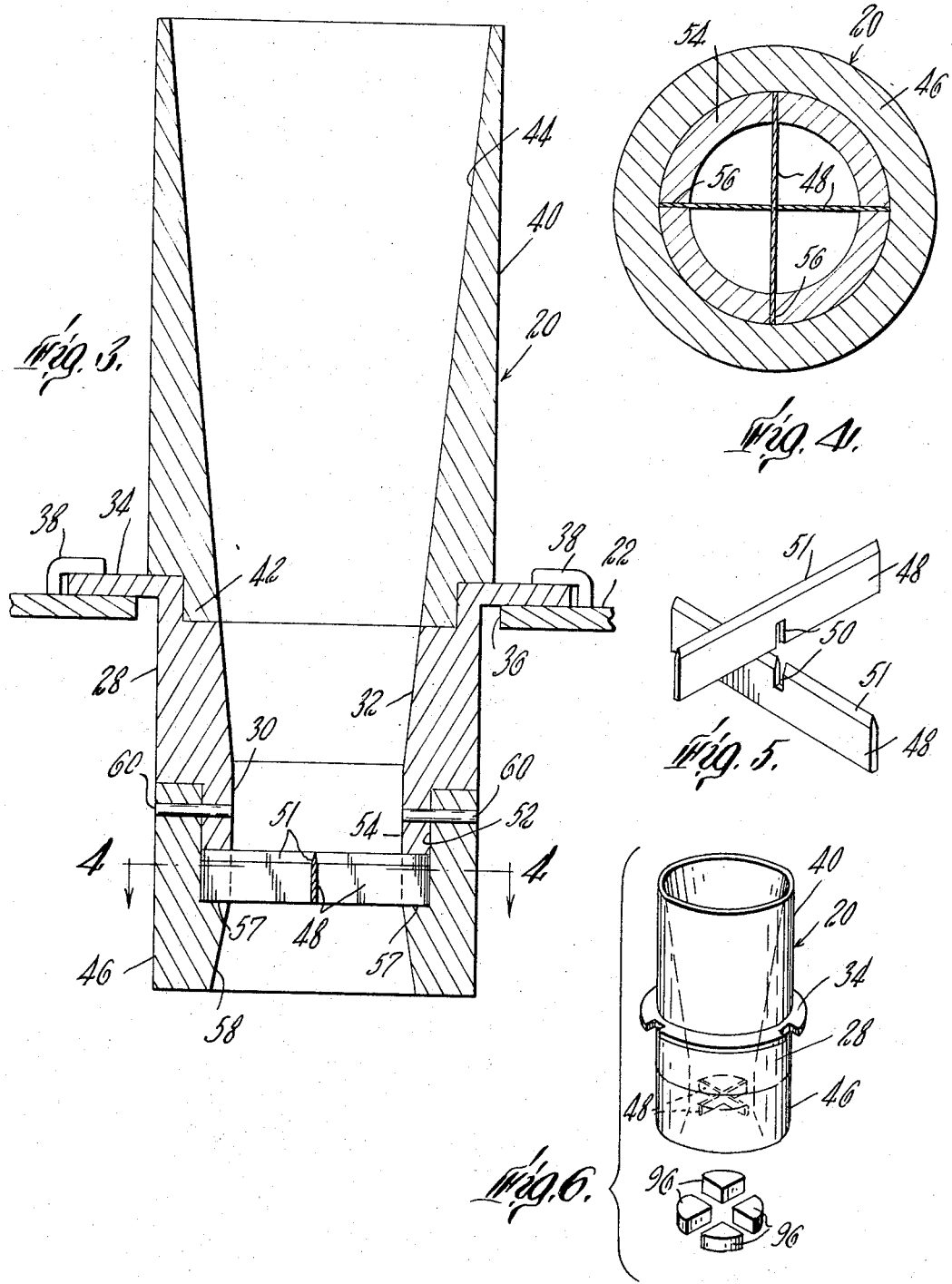

3,366,151
APPARATUS EMPLOYING AN AIR STREAM FOR CONVEYING OBJECTS THROUGH A CUTTING HEAD TO DIVIDE THEM INTO SEPARATE PORTIONS
La Vern H. Barrett, Gloucester, Mass., assignor to The Gorton Corporation, Gloucester, Mass., a corporation of Delaware
Filed July 27, 1965, Ser. No. 475,158
10 Claims. (Cl. 146—162)

ABSTRACT OF THE DISCLOSURE

Apparatus for cutting scallops or other objects comprising a vacuum chamber, a tubular cutting head passing through a wall of the chamber and having a cutting blade extending transversely of its bore, a liquid bath in said chamber, together with means for withdrawing air from the chamber to convey objects to be cut through the cutting head and eject the cut objects from it into the liquid bath, means for directing a spray of liquid into the open outer end of the cutting head and a conveyor submerged in the liquid bath for conducting cut objects out of the apparatus.

---

Figure 1:
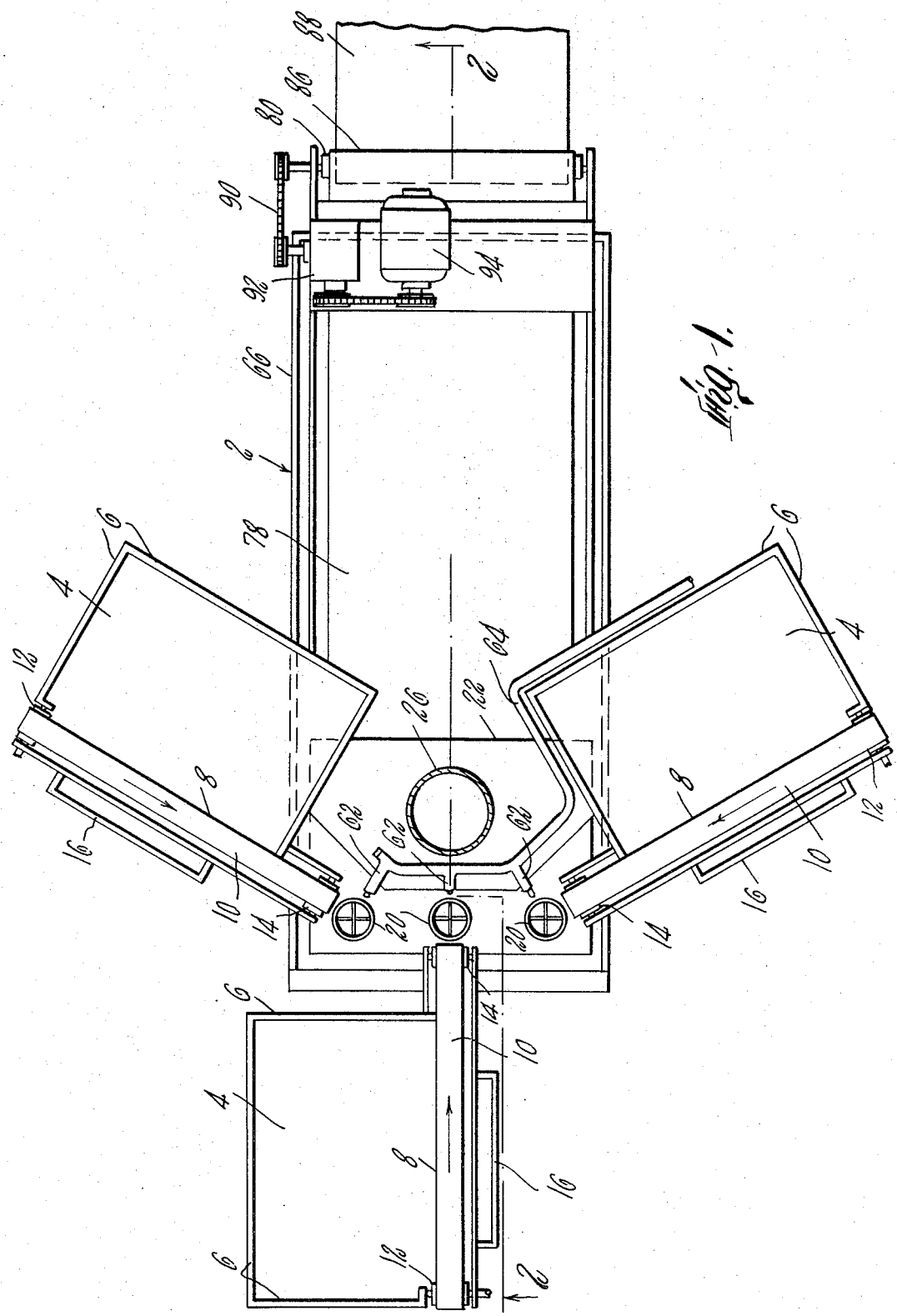

The present invention relates to cutting apparatus and more particularly to apparatus for use in dividing individual objects into a plurality of separate portions.

The apparatus of the invention is of particular utility in cutting scallops into a plurality of separate portions and will be disclosed herein with reference to that application. The scallop consists of two shells, the viscera and a single large adductor muscle, also sometimes called the "meat" or "eye" of the scallop, which is the edible portion referred to hereinafter as a scallop. In preparing scallops for marketing in some cases it is necessary to divide the scallop into several portions by transverse cuts. This operation heretofore has been performed by slicing the scallops by hand into the desired portions. Due to the soft and readily deformable nature of the scallop it is difficult to cut the scallop into uniformly shaped portions and such hand cutting operations are time-consuming and costly.

An object of the invention is to provide apparatus for conveniently dividing a series of objects fed to it into a plurality of substantially uniform portions.

Another object of the invention is to provide an apparatus which will readily cut into portions soft and deformable objects such as scallops fed to it in series.

In accordance with the invention the cutting apparatus comprises a vacuum chamber, a tubular cutting head passing through a wall of the chamber and having a cutting blade extending transversely of its bore, and means for withdrawing air from the vacuum chamber to cause a flow of air inwardly through the cutting head to carry the scallops through the cutting head. Desirably the apparatus further includes means for directing a spray of liquid into the entrance of the cutting head, which lubricates the inner surface of the cutting head and facilitates passage of the scallops therethrough. Additionally the apparatus may include means for containing a bath of liquid below the cutting head into which the severed portions of the scallops as they issue from the cutting head may fall without being damaged. It also may include a conveyor having its receiving end submerged in the liquid below the cutting head and adapted to convey the cut portions out of the apparatus. In a further preferred form the apparatus also includes a work table adjacent the cutting head and a conveyor on which an operator may place scallops after they have been inspected and prepared, the conveyor dropping the scallops one by one into the cutting head. The apparatus also may include a reject receiver adjacent the work table for the reception of reject scallops and other reject material.

As a scallop enters the cutter head it is seized by the blast of air flowing inwardly through the head and supported, suspended and cushioned in the air stream substantially free from deforming stress so that the scallop retains substantially its normal shape and size. The air stream conveys the scallop through the cutting head and projects it forcibly against the cutter blades so that it is instantly cut into the desired number of portions, substantially without deforming it from its normal shape. The severed portions fall into the liquid bath, by which their movement is halted without damaging them, and settle through the liquid on to the conveyor whence they are conducted from the apparatus.

Other and further objects, features and advantages of the invention will become apparent from the following description of an illustrative embodiment of the invention particularly designed for cutting scallops, in which description reference is made to the accompanying drawing, wherein, FIG. 1 is a plan view of the apparatus;
FIG. 2 is a vertical sectional view taken on line 2—2 of FIG. 1;
FIG. 3 is a vertical mid-sectional view of the cutting head forming part of the apparatus;
FIG. 4 is a horizontal view taken on line 4—4 of FIG. 3;
FIG. 5 is a detail perspective view of the cutter blades forming part of the cutting head of FIG. 3; and,
FIG. 6 is a perspective view of the cutting head illustrating the nature of the separate portions which in one modification it can provide.

Referring to the illustrative embodiment disclosed in the drawings, the apparatus comprises a framework 2 adapted to rest on the floor and on which the remaining parts of the apparatus are supported.

Supported on the framework 2 are a plurality of worktables 4, in this instance three worktables, each having an upstanding rim 6 surrounding it on three of its sides, affording an open edge at 8. Below and adjacent the edge 8 is disposed a conveyor 10 running about pulleys 12 and 14 and driven in any suitable manner as by an independent electric motor drive, not shown. At the opposite side of the conveyor 10 from the work table 4 is a reject receiver in the form of a chute 16 having an open upper end near the conveyor 10 and leading downwardly to a reject receptacle such as the pail 18. The entire assembly of conveyor, reject receiver and worktable, is suitably supported on the framework 2.

Disposed beneath the discharge end of each conveyor 10 is a tubular cutting head 20, shown in detail in FIG. 3. Each cutting head is supported on a vacuum chamber 22 with its axis disposed substantially vertically. An exhaust fan 24 is connected by exhaust conduit 26 to the interior of vacuum chamber 22 to draw air therefrom and thus produce a condition of lowered pressure therein causing a blast of air to flow into the open upper end of cutting head 20 and downwardly therethrough.

Referring particularly to FIGS. 3–6, the tubular cutting head 20 comprises a cylindrical body section 28 having a cylindrical bore 30 in its lower end and a conical bore 32 tapering upwardly as shown and opening into the cylindrical bore 30 and into the upper end of the body section 28. At its upper end, the body section 28 is provided with an outwardly extending annular flange 34 adapted to rest on a horizontal portion of the wall of the vacuum chamber 22 with the main part of the body section 28 passing through a circular opening 36 in the vacuum chamber. The flange 34 is adapted to be secured to the vacuum chamber 22 by lugs 38 forming part of a conventional twist lock joint. Seated in a counterbore in the top of the body section 28 is a cylindrical upper section 40 having a reduced lower end at 42 received in the counterbore. The upper section 40 has therein a conical bore 44 tapering upwardly as shown, and lying in prolongation of the conical surface 32. The tubular cutting head further includes a cylindrical lower section 46 adapted to support the cutter blades 48 which are slotted at 50 as shown so that they interfit, with their cutting edges 50 extending transversely of the bore of the cutting head. The lower section 46 is provided with a cylindrical bore 52 in its upper portion adapted to inter-fit with the reduced lower end 54 of the body section 28. The reduced lower end 54 is provided with vertical slots 56 opening into its lower annular base adapted to straddle the cutting blades 48 to hold them in position, the lower edges of the ends of the blades 48 resting on shoulders 57 at the bottom of the bore 52. Below the shoulders 57 the lower section 46 is formed with a concentric conical bore 58 tapering downwardly as shown, whose diameter at its upper edge is the same approximately as the diameter of the cylindrical bore 30 in the body section 28. The body section 28 and the lower section 46 are secured together by pins 60.

A water spray nozzle 62 is disposed above each of the cutting heads 20 in position to direct a spray of water downwardly into the open upper end of the cutter head, the nozzles being connected to a common water supply header 64.

Supported on the framework 2 beneath the vacuum chamber 22 is an open topped tank 66 adapted to contain water 68 introduced through water supply pipe 70 and maintained at a constant level by a level control drain 72. A water overflow drain is provided at 74. The vacuum chamber 22 is provided with an open lower end 76 arranged to be submerged in the water 68. A conveyor 78 running on rollers 80, 82 is mounted in the tank 66 with its receiving end 84 submerged in the water 68 beneath the open lower end 76 of the vacuum chamber 22. The conveyor 78 receives cut portions of the scallops, which fall from the cutting head 20 into the water 68 and settle therein onto the receiving end 84 of the conveyor, and conveys them transversely of the tank 66 to be discharged from the tank at the discharge end 86 of the conveyor. The cut portions may be received in any desired manner from the conveyor 78, as by a take away conveyor 88. The conveyor 78 is suitably driven through chain 90, a speed reducer 92 and an electric motor 94.

The operation of the cutting apparatus of the invention will be largely apparent from the foregoing description of its construction. The scallops to be processed are delivered to the work tables 4 in any desired manner. An operator at each table individually inspects each scallop, separating viscera or any other undesired material from it and throwing the reject material into the reject chute at 16 together with any defective scallops which are to be discarded. The scallops are then dropped on the conveyor 10 which moves them transversely of the work table and drops them one by one into the open upper end of the cutting head 20. A spray of water from the spray nozzle 62 is continuously introduced into the cutter head serving to keep it clean and to lubricate its interior surface for smooth flow of the scallops therethrough. The water also contributes to a sealing action between the scallop and the interior bore of the cutter head to enhance the effect of the downwardly flowing air stream on the scallop in projecting it into contact with the cutters 48. As the scallops pass the cutting blades 48 they are severed into portions 96, FIG. 6, which then fall into the water 68 and settle through the open lower end of the vacuum chamber 22 on to the conveyor at 84. Due to the nature of the uniform support from all directions afforded by the air stream, the scallops as they travel downwardly through the cutting head toward the cutter blades remain substantially undeformed in their natural shape and size. As the cutters 48 are extremely sharp and thin, the scallops are so quickly and easily cut that the severed portions retain substantially their initial natural shape. The water at 68 receives the scallops and prevents damage to the cut portions.

While the foregoing description has referred to scallops as an instance of an object to which the cutting apparatus of the invention is applicable, the invention is not confined thereto and may be used for the severing into a plurality of portions of various objects and materials whose nature lends them to being cut in the manner effected by the invention.

While the specific embodiment described for purposes of illustration and disclosure of the invention includes two cutter blades, it will be readily understood that a larger or smaller number of blades may be employed. Other modifications of the particular structure described will occur to those skilled in the art and the invention includes all such variations which are included in the following claims.

I claim:

1. Cutting apparatus comprising a tank adapted to contain liquid, a vacuum chamber having an open lower end opening into said tank and adapted to be immersed in liquid in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, a cutting blade supported by said cutting head and having a cutting edge extending transversely of the bore thereof, and a work table adjacent said cutting head.

2. Cutting apparatus comprising an open-topped tank adapted to contain liquid, a vacuum chamber having an open lower end opening into said tank and adapted to be immersed in liquid in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, a cutting blade supported by said cutting head and having a cutting edge extending across the bore thereof, and a conveyor in said tank having a receiving end disposed below the open lower end of said vacuum chamber and adapted to be submerged in liquid in said tank and having a discharge end adapted to discharge from the tank material falling on to the conveyor.

3. Cutting apparatus comprising an open-topped tank adapted to contain liquid, a vacuum chamber having an open lower end opening into said tank and adapted to be immersed in water in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, a cutting blade supported by said cutting head and having a cutting edge extending across the bore thereof, a conveyor in said tank having a receiving end disposed below the open lower end of said vacuum chamber and adapted to be submerged in liquid in said tank and having a discharge end adapted to discharge from the tank material falling on to the conveyor and a work table adjacent said cutting head.

4. Cutting apparatus comprising an open-topped tank adapted to contain liquid, a vacuum chamber having an open lower end opening into said tank and adapted to be immersed in liquid in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, cutting blades supported by said cutting head and having cutting edges extending across the bore thereof, a conveyor in said tank having a receiving end disposed below the open lower end of said vacuum chamber and adapted to be submerged in liquid in said tank and having a discharge end adapted to discharge from the tank material falling on to the conveyor, a work table adjacent said cutting head, and a conveyor adapted to receive workpieces from said work table and discharge them into the upper end of said head.

5. Apparatus for cutting scallops comprising a framework, an open-topped tank supported by said framework and adapted to contain liquid, a vacuum chamber supported on said framework and having an open lower end opening into said tank and adapted to be immersed in liquid in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, cutting blades supported by said cutting head and having cutting edges extending across the bore thereof, a conveyor in said tank having a receiving end disposed below the open lower end of said vacuum chamber and adapted to be submerged in liquid in said tank and having a discharge end adapted to discharge from the tank cut scallop portions falling on to the receiving end of the conveyor, a work table supported on said framework adjacent said cutting head, and a second conveyor adapted to receive scallops from said work table and discharge them into the upper end of said head.

6. Apparatus for cutting scallops comprisng a framework, an open-topped tank supported by said framework and adapted to contain liquid, a vacuum chamber supported on said framework and having an open lower end opening into said tank and adapted to be immersed in liquid in said tank, means for withdrawing air from said vacuum chamber, a tubular cutting head supported on said chamber, opening at its lower end into said chamber above said open lower end and having its upper end open to the atmosphere, means for discharging a spray of liquid into the upper end of said head, cutting blades supported by said cutting head and having cutting edges extending across the bore thereof, a conveyor in said tank having a receiving end disposed below the open lower end of said vacuum chamber and adapted to be submerged in liquid in said tank and having a discharge end adapted to discharge from the tank cut scallop portions falling on to the receiving end of the conveyor, a work table supported on said framework adjacent said cutting head, a second conveyor adapted to receive scallops from said work table and discharge them into the upper end of said head, and a reject receiver adjacent said work table.

7. Cutting apparatus comprising a vacuum chamber, a tubular cutting head connected to said chamber, and having its outer end open to the atmosphere and its inner end opening into said chamber, a cutting blade supported in said head and having a cutting edge extending transversely of the bore thereof, and means for withdrawing air from said vacuum chamber to cause air to flow into said open outer end and inwardly through said cutting head to convey objects placed in said open outer end through said head, past said cutting edge to be cut thereby, and eject the cut objects from said head into said chamber.

8. Cutting apparatus in accordance with claim 7, further comprising means for containing a liquid bath in said chamber adapted and arranged to receive cut objects ejected from said head.

9. Cutting apparatus in accordance with claim 8, further comprising means for directing a spray of liquid into said open outer end of said cutting head.

10. Cutting apparatus in accordance with claim 8, further comprising a conveyor adapted and arranged to be submerged in said liquid bath to convey cut objects outwardly of the apparatus.

References Cited

UNITED STATES PATENTS

| 1,961,009 | 5/1934 | Nachtigal | 146—163 |
| 2,694,218 | 11/1954 | Lapeyre et al. | 146—162 X |
| 2,920,520 | 1/1960 | Duba | 83—402 X |
| 2,956,838 | 10/1960 | Thoresen. | |
| 3,109,468 | 11/1963 | Lamb et al. | 146—78 |

FOREIGN PATENTS 842,420  6/1952  Germany.

JAMES M. MEISTER, *Primary Examiner.*